United States Patent [19]

Brzozowski et al.

[11] 4,163,087
[45] Jul. 31, 1979

[54] METHOD FOR PRODUCTION OF NEW THERMAL AND CHEMICAL RESISTANT POLYURETHANE PLASTICS

[75] Inventors: Zbigniew Brzozowski; Jedrzej Kielkiewicz; Gabriel Rokieki; Andrzej Kaminski; Danuta Chomicz; Boguskaw Goraj, all of Warsaw, Poland

[73] Assignee: Politechnika Warszawska, Warsaw, Poland

[21] Appl. No.: 843,703

[22] Filed: Oct. 19, 1976

Related U.S. Application Data

[63] Continuation of Ser. No. 611,840, Sep. 9, 1975, abandoned.

[30] Foreign Application Priority Data

Sep. 12, 1974 [PL] Poland .................... 174046
Jun. 23, 1975 [PL] Poland .................... 181469
Jun. 23, 1975 [PL] Poland .................... 181474

[51] Int. Cl.$^2$ ............... C08G 18/14; C08G 18/48; C08G 18/32
[52] U.S. Cl. .................... 521/176; 528/79; 260/18 PT; 521/177; 428/425
[58] Field of Search ........... 260/2.5 AP, 2.5 AM, 260/18 PT, 47 EP, 47 CB; 521/177; 528/79

[56] References Cited

U.S. PATENT DOCUMENTS

| 2,788,335 | 4/1957 | Barthel, Jr. ............ 260/18 PT |
| 3,184,420 | 5/1965 | Brack ................. 260/18 TN |
| 3,450,774 | 6/1969 | Vandenberg ............ 260/2.5 AP |
| 3,457,225 | 7/1969 | Damusis ............... 260/47 CB |
| 3,471,442 | 10/1969 | DiLeone ............... 260/47 CB |
| 3,632,836 | 1/1972 | Walker ................ 260/47 EP |
| 3,673,128 | 6/1972 | Hayash, Jr. et al. ..... 260/2.5 AW |
| 3,784,601 | 1/1974 | Jellinek et al. ........ 260/77.5 AP |
| 3,789,044 | 1/1974 | Taft et al. ............ 260/18 PT |
| 3,905,945 | 9/1975 | Iseda et al. ........... 260/2.5 AC |

FOREIGN PATENT DOCUMENTS

1091323 10/1960 Fed. Rep. of Germany ..... 260/2.5 AP
968102 8/1964 United Kingdom ............ 260/2.5 AP

*Primary Examiner*—H. S. Cockeram
*Attorney, Agent, or Firm*—Haseltine, Lake & Waters

[57] ABSTRACT

Method for production of new, thermal and chemical resistant polyurethane plastics, particularly in the form of foams, these foams being obtained from the reaction of di- or poly- isocyanates with polyols, said polyols having the formula 1 or 2 as herein described, Ar in the said formulas representing a benzene, naphthalene or anthracene ring, which may be singly or multiply substituted with a halogen atom, alkyl radical, aryl radical or allyl radical, Z representing the oxygen atom, a group $SO_2$ or a divalent radical —$CRR_1$— where R and $R_1$ represent a hydrogen atom or an alkyl radical, m and r represent 0 or 1, and n and p represent an integer 1–10, or their mixtures with other low-viscosity polyols or with a compound having formula 3 as herein described in which $R_2$ represents a simple or branched alkyl or aryl radical which can be substituted by a lower alkyl or aryl radical or by halogen atoms added in a quantity of 0.1–50 parts by weight, these being reacted with isocyanates or in the presence of catalysts, foaming agents and solvents.

9 Claims, No Drawings

METHOD FOR PRODUCTION OF NEW THERMAL AND CHEMICAL RESISTANT POLYURETHANE PLASTICS

This is a continuation of application Ser. No. 611,840 filed Sept. 9, 1975, now abandoned.

The invention relates to a method for production of new, thermal and chemical resistant polyurethane plastics, particularly in the form of foams to be used as construction materials in buildings of vehicles, in building engineering and in the industry of electric machines.

In accordance with the known methods for production of plastics, particularly of polyurethane foams, the polyethers are commonly used as polyol components, these polyethers being the reaction products of compounds containing an active hydrogen, said components including glycols, bisphenols, polyalcohols or polyamides with alkyl oxides or with epichlorohydrin. These polyethers have two hydroxyl groups and they react with diisocyanates or with polyisocyanates thus producing the linear or branched polyurethanes. Irrespective, however, of how functional these isocyanates may be, the polymers thus obtained have a comparatively low chemical and thermal resistance.

This imperfection can slightly be improved if the atoms of nitrogen or phosphorus, or the halogen or suitable filling agents are introduced to the structure of the polymer.

It has been discovered that there is another beneficial method which can be used for obtaining of plastics, this method being the subject of this invention and allowing particularly to obtain the polyurethane foams having high thermal and chemical resistance. This method consists in poly-addition reaction of diisocyanates and polyisocyanates with polyols having general formula 1:

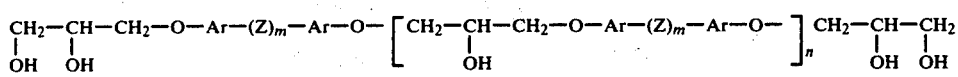
Formula 1 where Ar is either a benzene, naphthalene, or anthracene ring which may be singly or multiply substituted with an alkyl, aryl or allyl radical or by halogen atoms; Z is the oxygen atom, a group $SO_2$ or a divalent radical whose formula is $CRR_1$, where R and $R_1$ may be identical or different, and are either a hydrogen atom or an alkyl radical; m is either 0 or 1; and n is 0 or an integer 1–10, or their mixtures with other low-viscosity polyols, said mixtures being reacted with isocyanates or in the presence of catalysts, foaming agents and solvents.

The polyols used are multifunctional compounds having at least four hydroxyl groups in the compound and being able to react with groups of NCO isocyanates.

The four- or more functional polyols are obtained in result of catalytic hydrolysis of suitable epoxy resins, thus leading to obtaining of mixtures of polyols in accordance with the formula 1, different in these mixtures being only the value n. This is of particular advantage, since isolation of separate fractions of epoxy resins having the same value n is not required in this case. Of particular advantage is that the polyols obtained from hydrolysis of low-molecular epoxy resin of bisphenol A can be used in this case.

In accordance with a modified version of the invented method, the compounds having the general formula 2 are used as multifunctional polyols:

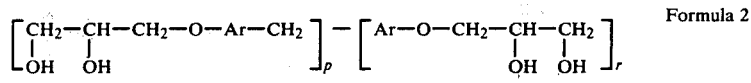
Formula 2 where Ar is as described above; p is an integer 1–10; and r is 0 or 1, or their mixtures with other low-viscosity polyols which are reacted with isocyanates or in the presence of catalysts, of foaming agents and solvents. The compounds having the formula 2, where Ar, p and r are as above described, are preferably used in the form of their mixtures obtained from hydrolysis of epoxy-novolak composition. Using of products of hydrolysis of epoxy-novolak composition improves the resistance of foams against the effect of chemicals and temperature, thus considerably extending the application range of obtained materials.

In order to considerably reduce the viscosity of the reaction mixture and thus to simplify the technology process, the multi-functional polyols having formulas 1 and 2, where all the symbols are as above described, are mixed with dihydroxyl derivatives of monoglycidyl ethers having formula 3:

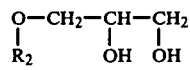
Formula 3 where $R_2$ is a simple or branched aryl radical possibly substituted by a lower alkyl or aryl radical, or by halogen atoms in the amount of 0.1–50 parts by weight relative to multi-functional polyols having formula 1 or 2, where all the symbols are as described above.

In accordance with the invention, preferably the compounds having formula 3, where $R_2$ is as described above, are used as products of hydrolysis of phenyl glycidyl ether. They can directly be added to the multi-functional polyols having formula 1 or 2 prior to the cross-linking by di- or poly-isocyanates, or in the case when the polyols having the formula 1 are used, they can be present in products of hydrolysis of a low-molecular epoxy resin of bisphenol A, if in the synthesis of this resin, consisting in reaction of epichlorohydrin with bis-phenols in the presence of alkaline hydroxides, the uni-functional compounds having the formula $R_2OH$ are simultaneously taking part, the $R_2$ symbol in the said formula having the same meaning as above described. Use of phenol is of particular advantage, this phenol transforming, in the result of reaction, into the phenyl glycidyl ether. In this case the reaction of synthesis quickly yields a mixture of epoxy resin and monoglycidyl ether, this mixture being then subjected to hydrolysis to obtain a mixture of multi-functional polyols used in production of polyurethane plastics.

Due to the fact that low-viscosity polyols having formula 3 are used, the $R_2$ symbol in the said formula having the same meaning for production of the new, thermal and chemical resistant polyurethane plastics as described above, less complicated equipment can be used for homogenizing of the reaction mixture, the previous equipment required to be resistant to high pressures.

The polyurethane plastics obtained in accordance with the invented method, particularly plastics in the form of foams, have the structure of a dense network and thus their chemical and thermal resistance is much higher in comparison with plastics obtained in accordance with conventional methods, their thermal resistance being better by 20°–50° C. They have very good mechanical parameters, particularly good being their compressive and shear strength, these parameters declining slightly only after a longer exposure to the effect of high temperature and of aggressive chemical media. Owing to their high chemical resistance the foams obtained in accordance with the invented method are suitable for coating them at one or both sides with polyester laminates thus obtaining highly resistant plastics of the sandwich type. Particularly important is the possibility of in situ production of sandwich type plastics, since the foams are highly resistant to the effect of styrene which is used in the process of laminating.

Owing to their very good mechanical properties and their high chemical and thermal resistance, the polyurethane plastics obtained in accordance with the invented method can have a wide range of application as construction materials in building engineering and in the industry of electric machines, in shipbuilding, in the air and motor industry, as insulating materials for pipelines and tanks, e.g. tanks containing liquid sulphur, and also as insulating materials for ice refrigerators, coolers, etc.

The invention will now be described by way of practical examples, these examples not confining, however, the application range of the invention.

EXAMPLE I.

8 g of multi-functional polyol obtained from catalytic hydrolysis of epoxy resin of bisphenol A—(commercial name Epidian 5 (manufactured by Chemical Factory Sarzyna, Poland) which is a low-molecular epoxy resin, a derivative of Bisphenol A and epichlorohydrin, having an epoxy number of about 0.5 epoxy gram-equivalent per 100 g of resin, and a viscosity of 10,000–40,000 centipoises at 20° C. After the hydrolysis thereof, a polyol is obtained with a yield of 90%, containing no epoxy groups but has two hydroxyl groups at each end of the molecule—is mixed at the temperature of 65°–75° C. with 20 g of polyol—(commercial name Desmophen 5900 (manufactured by Bayer, Germany) an aliphatic polyester, having at the ends of the molecule hydroxyl groups, with a viscosity of 500–2,000 centipoises at 20° C.)—and with reaction catalysts—commercial names DABCO (manufactured by Fluke AG, Switzerland) and denotes an organotin catalyst) and TELA (i.e., triethanolamine) in amounts of 0.1 and 1.5 g respectively. After obtaining a homogeneous consistency and after the obtained mixture has been cooled, 0.5 g of water is added as a foaming agent. The whole is mixed for 10–15 minutes, and then subjected to a reaction with 27.6 g of isocyanate—(commercial name Desmodur 44 P 90 (manufactured by Bayer, Germany) which denotes a polyisocyanate, a derivative of diphenylmethane, having a viscosity of 500–1000 centipoises at 20° C.). Intensive mixing produces a foam which stiffens after a few minutes. The resulting material has a compressive strength of 3.6 kg/cm$^2$ at a deformation of 10%, and 5.2 kg/cm$^2$ at a deformation of 50%. The apparent density of the foam is 96 kg/m$^3$. The foam is fully resistant to the effect of styrene, this resistance being observed during laminating of the foam with polyester compositions hardened with styrene.

EXAMPLE II.

8 g of polyol obtained from catalytic hydrolysis of epoxy resin—(commercial name Beckopox 37-200 (manufactured by BXL Bakelite, Great Britain) a low-molecular epoxy resin, a derivative of Bisphenol A and epichlorohydrin, having an epoxy number of about 0.55 gram-equivalent per 100 g of resin, and a viscosity of 5,000–15,000 centipoises at 20° C.).

(After the hydrolysis thereof polyol is obtained with a yield of 95%, comprising no epoxy groups but instead thereof it contains two hydroxyl groups at each end of the molecule—based on the bromine, Bisphenol A, is mixed at the temperature of 55°–60° C. with 15 g of polyester—(commercial name Bypolet (manufactured by Chemical Factory Bydgoszcz) and denotes an aliphatic oligopolyether having the viscosity of 500–1,000 centipoises at 20° C., comprising hydroxyl groups at the ends of the molecule). Freon is introduced to the homogeneous mixture, which has been cooled to a temperature of 15° C., as a foaming agent, the mixture being then subjected to a reaction with 17 g of isocyanate—(commercial name Suprasec 44 V (manufactured by I.C.I., Great Britain) which denotes a polyisocyanate, derivative of diphenylmethane, having the viscosity of 300–900 centipoises at 20° C.). Foaming is conducted in a closed mould, thus obtaining a stiff foam having the following parameters: apparent density 160 kg/m$^3$; compressive strength 11 kg/cm$^2$ at a deformation of 10% and 16.4 kg/cm$^2$ at a deformation of 50%. The obtained foam has a good chemical resistance while the presence of bromide gives to it the qualities of a self-quenching plastic.

EXAMPLE III.

The procedure is the same as in Example II, using 11.8 g of polyol obtained from hydrolysis of naphthalene epoxy resin based on 6-bromo-2-naphthol. The obtained foams have high thermal resistance and they possess self-quenching properties.

EXAMPLE IV.

10 g of polyol obtained from hydrolysis of epoxy resin of bisphenol A—(commercial name Araldit F which denotes a low-molecular epoxy resin, a derivative of bisphenol A and epichlorohydrin, having an epoxy number of about 0.55 epoxy gram-equivalent per 100 g of resin, and having the viscosity of 10,000–20,000 centipoises at 20° C. After the hydrolysis thereof, polyol is obtained with a yield of 90% containing no epoxy groups but instead whereof comprising two hydroxyl groups at each end of the molecule,) is dissolved at the temperature of 50°–70° C. in 10 g of polyester—(commercial name Poles 40/21 (manufactured by Chemical Factory Bydgoszcz, Poland) which denotes an oligopolyester, an aliphatic one, having a molecular mass of 2100, and containing hydroxyl groups at the ends of the molecules,) together with catalysts of the cross-linking reaction. After cooling to a temperature of 15°–17° C., Freon is introduced as a foaming agent, the mixture being then reacted with 22 g of isocyanate—Suprasec 44V (manufactured by I.C.I., Great Britain). The apparent density of the porous plastic in a closed mould is 200 kg/cm$^3$, while its compressive strength is 11.8 kg/cm$^2$ at a deformation of 10%.

EXAMPLE V.

The procedure is the same as in Example IV with the exception that 2 g toluene is additionally introduced to the mixture of polyols in order to reduce the viscosity of composition.

EXAMPLE VI.

The procedure is the same as in Example IV, using 8.5 g of four-functional polyol obtained from catalytic hydrolysis of diglycidyl ether of bisphenol A. Owing to the fact that the obtained product has a very low viscosity, the produced foam may be used for filling of complex shapes.

EXAMPLE VII.

6.5 g of polyol obtained from hydrolysis of epoxy resin synthesized in the reaction of bis(4-hydroxyphenyl)-sulphone with epichlorohydrin is dissolved at the temperature of 60°–75° C. in 8 g of polyester—commercial name Bypolet, together with suitable catalysts. 0.4 g of water is introduced to the homogeneous composition which is then reacted with 24.3 g of isocyanate—commercial name Desmodur 44 P 90. There is a foam produced in result of mixing process, this foam stiffening after 30 minutes, thus yielding a porous material suitable for insulation purposes.

EXAMPLE VIII.

22 g of polyol obtained from hydrolysis of epoxy resin based on bis(6-hydroxyanthracyl)methane is dissolved at the temperature of 70° C. in a mixture composed of 10 g of cyclohexanone and 45 g of dioxane. After adding 0.2 g of cobalt naphthenate as an accelerator of the polyol reaction with isocyanate, and 0.5 g of silicone polyol as a surface-active agent, the whole is cooled and mixed with 25 g of n-butyl acetate. The obtained polyol solution is then reacted with 18 g of isocyanate - (commercial name Izocyn T-100 (manufactured by Chemical Factory Bydgoszcz, Poland) denotes a polyisocyanate, a derivative of toluene, having the viscosity of 200–500 centipoises at 20° C.). The obtained lacquer is applied on a metal surface and then hardened for 1 hour at the temperature of 130° C. The coating which is thus obtained is perfectly smooth and glossy, it adheres well to the base and is highly resistant against impact and scratching.

EXAMPLE IX.

To a mixture of 8 g of multi-functional polyol obtained from catalytic hydrolysis of low-molecular epoxy resin of bisphenol A—commercial name Araldit F, with 2.0 g of dihydroxyl derivative of phenyl glycidyl ether, 20 g of polyol—commercial name Desmophen 5900, is added at the temperature of 40°–50° C., together with reaction catalysts: 1.5 g triethanolamine and 0.1 g of ethylenediamine. After a homogeneous consistence is achieved, 0.3 g of water is added to the mixture as a foaming agent. After the whole is carefully mixed, it is reacted with 26.2 g of isocyanate—commercial name Desmodur 44 P 90. After a few minutes a stiffening foam is formed during mixing. The compressive strength of the obtained plastic having a porous structure is 2.9 kg/cm$^2$ at a deformation of 10% and 5.0 kg/cm$^2$ at a deformation of 50%. The foam is fully resistant against the effect of styrene.

EXAMPLE X.

The procedure is the same as in Example IX, but 2.0 of dihydroxyl derivative of phenyl glycidyl ether is substituted with 1.8 g of dihydroxyl derivative of butyl glycidyl ether.

EXAMPLE XI.

8 g of polyol obtained from hydrolysis of epoxy resin of bisphenol A—commercial name Epidian 5, is mixed with dihydroxyl derivative of p-butyl-phenyl glycidyl ether, and after heating to the temperature of 50° C., 18 g of polyester—commercial name Bypolet—is added together with suitable catalysts. To the homogeneous composition the Freon is introduced at the temperature of 15° C., this Freon being the foaming agent, and then the whole is reacted with 26.7 g of isocyanate—commercial name Desmodur 44 P 90. Foaming in a closed mould gives a stiff foam having the following parameters: apparent density 125 kg/m$^3$; compressive strength 15.1 kg/cm$^2$ at a deformation of 50%; proportion of open pores, 70%; thermal resistance, 202° C., determined by derivatography.

EXAMPLE XII.

The procedure is the same as in Example XI, with the exception that in place of 2 g of the dihydroxyl derivative of p-butylphenyl glycidyl ether, 2.8 g of the dihydroxyl derivative of p-chloro-phenyl glycidyl ether is used.

EXAMPLE XIII.

9 g of the product obtained from the catalytic hydrolysis of an epoxy-novolak composition—consisting of a low-particle epoxy-novolak, phenyl glycidyl ether and phenol, is mixed at the temperature of 65°–75° C. with 20 g of polyol—commercial name Desmophen 5900—and with reaction catalysts—commercial names DABCO and TELA—used in quantities of 0.1 g and 1.5, respectively. After a homogeneous consistency is obtained and after the resulting mixture is cooled, 0.5 g of water is added as a foaming agent. The whole is mixed for 10–15 minutes, and is then reacted with 27.6 g of isocyanate—commercial name Desmodur 44 P 90. An intensive mixing produces the foam which stiffens after a few minutes. The compressive strength of the obtained plastic is 12.5 kg/cm$^2$ at a deformation of 50%. The apparent density of the foam is 210 kg/m$^3$. The plastic is resistant against the effect of styrene, this resistance observed at lamination with a polyester composition hardened by styrene.

EXAMPLE XIV.

9 g of the product obtained from the catalytic hydrolysis of an epoxy-novolak, consisting of a low-molecular epoxy-novolak, phenyl glycidyl ether and phenol, is mixed at the temperature of 55–60PC with 15 g of polyester—commercial name Bypolet. Freon is introduced to the homogeneous mixture which has been cooled to a temperature of 15° C., this Freon being the foaming agent, the mixture being then reacted with 17 g of isocyanate—commercial name Suprasec 44V. The foaming process is conducted in a closed mould, the obtained stiff foam having the following parameters: apparent density 160 kg/m$^3$; compressive strength 12.1 kg/cm$^2$ at a deformation of 10% and 16.6 kg/cm$^2$ at a deformation of 50%. The produced foam has a good chemical resistance, and due to the presence of bromine it has the qualities of a self-quenching material.

We claim:

1. A method for production of thermal and chemical resistant polyurethane plastics, in the form of forms, these foams being obtained from reaction of di- or poly-isocyanates with polyols, wherein the polyols have the formula 1:

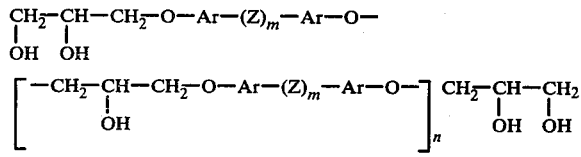

in which Ar is either a substituted or unsubstituted benzene, naphthalene, or anthracene ring, said substituents being one or more alkyl, aryl or allyl radicals or halogen atoms; Z is the oxygen atom, an $SO_2$ group or a divalent radical, $-CRR_1-$, where R and $R_1$ may be identical or different and are either a hydrogen atom or an alkyl radical; m is 0 or 1; and n is 0 or an integer 1–10, or their mixtures with other low-viscosity polyols, said mixtures being reacted with di- or poly-isocyanates in the presence of catalysts, foaming agents and solvents.

2. A method according to claim 1 for production of thermal and chemical resistant polyurethane plastics, these compounds being obtained from reaction of di- or poly-isocyanates with polyols, wherein the polyols have the formula 1:

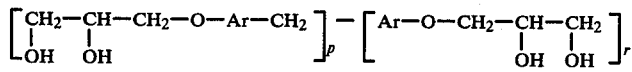

in which Ar is either a substituted or unsubstituted benzene, naphthalene, or anthracene ring, said substituents being one or more alkyl, aryl or allyl radicals or halogen atoms; Z is the oxygen atom, an $SO_2$ group or a divalent radical, $-CRR_1-$, where R and $R_1$ may be identical or different and are either a hydrogen atom or an alkyl radical; m is 0 or 1; and n is 0 or an integer 1–10, or their mixtures with other low-viscosity polyols, said mixtures being reacted with di- or poly-isocyanates in the presence of catalysts and solvents and in the absence of foaming agents.

3. A method as claimed in claim 1, wherein the polyols having Formula 1, are used in the form of a mixture obtained from hydrolysis of epoxy resin, particularly of a low-molecular, epoxy resin of bisphenol A.

4. A method as claimed in claim 1, wherein the compounds having formula 2

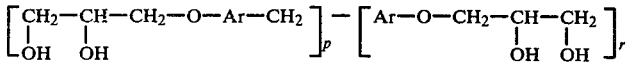

are used as polyols, the Ar symbol in said formula having the same meaning as in claim 1; p representing an integer 1–10; and r representing 0 or 1, or their mixtures with other low-viscosity polyols, said mixtures being reacted with di- or poly-isocyanates in the presence of catalysts, foaming agents and solvents.

5. A method as claimed in claim 4, wherein dihydroxyl derivatives of glycidyl ethers are used as other low-viscosity polyols, said derivatives having formula 3

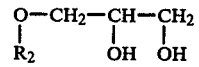

in which $R_2$ is a simple or branched alkyl radical with 2–15 carbon atoms, or an aryl radical which may be substituted by a lower alkyl or aryl radical, or by halogen atoms in a quantity of 0.1–50 parts by weight relative to multi-functional polyols having formula 1 in which Ar is either a substituted or unsubstituted benzene, naphthalene, or anthracene ring, said substituents being one or more alkyl, aryl or allyl radicals or halogen atoms; Z is an oxygen atom, and $SO_2$ group or a divalent radical, $-CRR_1-$, where R and $R_1$ may be identical or different and are either a hydrogen atom or an alkyl radical; m is 0 or 1; and n is 0 or having formula 2

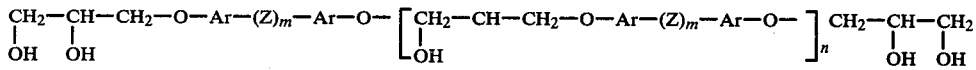

in which Ar is as defined above, p is an integer of from 1 to 10 and r is 0 or 1.

6. A method as claimed in claim 5, wherein the low-viscosity polyols having formula 3

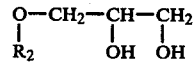

in which $R_2$ is a simple or branched alkyl radical with 2–15 carbon atoms, or an aryl radical which may be substituted by a lower alkyl or aryl radical, or by halogen atoms are used in the form of products obtained from hydrolysis of phenyl glycidyl ether.

7. A method as claimed in claim 4, wherein the polyols having formula 2, in which Ar, p, and r have the same meaning as in claim 4, are used in the form of their mixture obtained from hydrolysis of an epoxy-novolak composition.

8. A method as claimed in claim 1, wherein dihydroxyl derivatives of glycidyl ethers are used as other low-viscosity polyols, said derivatives having formula 3

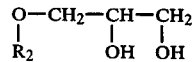

in which $R_2$ is a simple or branched alkyl radical with 2-15 carbon atoms, or an aryl radical possibly substituted by a lower alkyl or aryl radical, or by halogen atoms in a quantity of 0.1-50 parts by weight relative to multi-functional polyols having formula 1 in which Ar, Z, m and n have the same meaning as in claim 1, or having formula 2

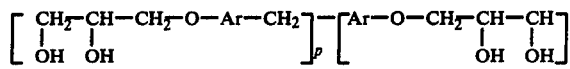

in which Ar is as in claim 10 where p is an integer 1–10 and r is zero or 1.

9. A method as claimed in claim 8, wherein the low-viscosity polyols having formula 3 in which $R_2$ is as in claim 5, are used in the form of products obtained from hydrolysis of phenyl glycidyl ether.